(12) United States Patent
Balwani (10) Patent No.: US 8,532,069 B2
(45) Date of Patent: Sep. 10, 2013

(54) LOCAL AREA WIRELESS AIRSPACE MANAGEMENT

(76) Inventor: Ramesh Balwani, Palo Alto, CA (US)

(*) Notice: Subject to any disclaimer, the term of this patent is extended or adjusted under 35 U.S.C. 154(b) by 913 days.

(21) Appl. No.: 11/525,805

(22) Filed: Sep. 22, 2006

(65) Prior Publication Data

US 2007/0117558 A1 May 24, 2007

Related U.S. Application Data

(60) Provisional application No. 60/719,770, filed on Sep. 23, 2005.

(51) Int. Cl.
*H04W 4/00* (2009.01)
(52) U.S. Cl.
USPC ............... 370/338; 455/435.1; 455/432.1
(58) Field of Classification Search
USPC ... 370/338, 310, 328; 455/422.1, 432.1–433, 455/435.1
See application file for complete search history.

(56) References Cited

U.S. PATENT DOCUMENTS

| | | | | |
|---|---|---|---|---|
| 7,599,993 | B1* | 10/2009 | Murphy et al. | 709/206 |
| 2003/0008662 | A1* | 1/2003 | Stern et al. | 455/456 |
| 2004/0147255 | A1* | 7/2004 | Lee | 455/422.1 |
| 2005/0134696 | A1* | 6/2005 | Nath et al. | 348/211.9 |
| 2005/0181780 | A1* | 8/2005 | Park | 455/422.1 |

* cited by examiner

*Primary Examiner* — Ajit Patel
(74) *Attorney, Agent, or Firm* — Winston & Strawn LLP (57) ABSTRACT

A mobile wireless device that is implemented to provide personal communications services in a wireless communications network can be integrated with hardware and/or software to manage the device at the device level at the local level. Management can be implemented to be invisible to wireless device user such as to be implemented without requiring user initiation to acknowledge or allow management to proceed. Local management can be implemented on a real time basis to manage the usage or operation of a device, device components or software integrated into the device. Different policies can be applied within a local airspace management network. Security measures can also be implemented to assure that local airspace management is applied by a trusted network. Information associated with a local airspace management network such as user biometrics, trusted network certification, authentication information can be stored in a wireless device.

26 Claims, 5 Drawing Sheets

LOCAL AREA WIRELESS AIRSPACE MANAGEMENT

RELATED PATENT APPLICATION

This application claims the benefit of U.S. Provisional Patent Application No. 60/719,770 filed Sep. 23, 2005, which is hereby incorporated herein by reference in its entirety.

BACKGROUND OF THE INVENTION

Mobile wireless devices that provide personal communications services are widely used throughout the world in rapidly increasing numbers. A cellular telephone, otherwise known as a mobile telephone is the typical example of such devices. However, such devices can also be of the type that provides other forms of personal communications services such as e-mail, text messaging, paging, personal notebook computers, gaming consoles etc. Such devices and networks are designed to allow users the mobility to roam throughout the network to access communications services that are managed at the network level. However, these network-based services do not take into account the needs or concerns of the local entities such business offices, government building, university campuses, or other areas to which a wireless device may roam. Such needs or concerns can include the need to protect confidential information, to protect the privacy of individuals present on their premises, to avoid the usage of wireless devices to be a nuisance to others, or to control the content or applications that can be used by particular users. With respect to security and privacy, the need for an appropriate solution is rapidly increasing because of the integration of wireless communications devices with other hardware such as cameras, video and digital voice recorders. Existing solutions do not adequately address concerns that arise at the local level. One existing solution has been to confiscate a user's device when a user enters an office to prevent unauthorized use. However, this deprives the user of any other unobjectionable information or features that may exist on the device.

Therefore, it is desired to provide solutions that meet the local policy needs of entity with respect to wireless devices when a wireless device enters that entity's airspace.

SUMMARY

A mobile wireless device that is implemented to provide personal communications services in a wireless communications network can be integrated with hardware and/or software to manage the device at the device level (e.g., control device usage or operation at the device) at the local level. Entities, such as business, public places, governments, who wish to manage their airspace can implement such local airspace management networks for example by implementing a local network that communicates or applies local policies to the device. This local management can be implemented for any wireless network device that enters that locality. Management via the local network can be implemented independent of or separate from: the communications network of the wireless device, the frequency spectrum assigned to the device for providing wireless communications services, or the operating platform (e.g., operating system, processor, or combinations thereof) of the wireless device. Thus, each entity or locality may apply different policies at the device level when a device is in the vicinity of that local airspace management network that is implemented by that entity. Moreover, within such a local airspace management network, different areas of the network can apply different policies to wireless devices that have entered the vicinity of the network.

Management can be implemented to be invisible to wireless device user such as to be implemented without requiring user initiation to acknowledge or allow management to proceed. Thus, various types of wireless devices (e.g., devices assigned various frequency bands for personal communications services, devices providing different forms of personal communications services, or devices that implement different communications protocols for providing personal communications services) that are operable in an area serviced by a related personal communications network, can also be locally managed when the devices are within the vicinity of a local airspace management network. For example, the devices can be automatically managed to implement the local policies of an entity. In some embodiments, a local entity may for example implement a local airspace management network to manage third party wireless networks that serve the local entity's airspace. In one embodiment, the third party wireless services may be type of service or form of communications (e.g., voice communications) that is not supported locally by the entity as part its existing computer infrastructure. In another embodiments, the local entity's computer infrastructure can be of the type that supports or is configured to provide the type of wireless communications services that the local airspace management network is implemented to manage.

Local management can be implemented on a real time basis to manage the usage or operation of a device, device components (hardware or software, peripherals (e.g., speaker, display, keyboard, microphone, etc.), or hardware (e.g., camera, voice recorder, etc.) or software integrated into the device.

Different policies can be applied within a local airspace management network. As such, by applying different policies to a wireless device in different areas, a device may acquire various different states as a user of the device roams within a local airspace management network. Thus, even if a device is configured to be capable of providing a particular feature (e.g., a feature that is hardware and/or software based) within a supporting network, a local airspace management network can operate to disable or manage that feature. For example, the local airspace management network can demand, request, or recommend user compliance with a local policy which when implemented temporarily contravene prior user settings or control.

A local airspace management network can be configured to interact with wireless devices to authenticate the user of a device. Authentication may be used to apply a local policy to an authenticated user. For example, authentication may identify various categories of users such as trusted users, guests, or contractors. Directory services of local entity can be connected to the local airspace management network to provide authentication services and to identify authorized users of the local entity's computer network (e.g., enterprise network).

Security measures can also be implemented to assure that local airspace management is applied by a trusted network. For example, a certification process may be implemented to certify local networks. If desired, third party certification can be used to implement such security measures.

Information associated with a local airspace management network such as user biometrics, trusted network certification, authentication information can be stored in a wireless device. Such information may be automatically retrieved and used when needed, for example, when a user reenters a particular local airspace management network.

A local airspace management network can include a transmitter and associated hardware and/or software that implement the local airspace management policy of an entity. For example, a transmitter can be designed and configured to include circuitry, which can be hardware, software, or a combination thereof, to implement a local airspace management network, to implement network protocols, to carry wireless communications (one way or two way with a transceiver) in the local airspace management network, combinations thereof, or other related functionality. The network may include multiple transmitters (and associated hardware and/or software) that are arranged to provide coverage over a dispersed area (e.g., an area that is not sufficiently covered by a single transmitter). Multiple transmitters can also be implemented to vary policy settings based on the device's vicinity to a particular transmitter. Transmitters may be networked to allow for centralized management or access to network information.

BRIEF DESCRIPTION OF THE DRAWINGS

Further features of this invention, its nature and various advantages will become more apparent upon consideration of the following detailed description, taken in conjunction with the accompanying drawings, in which like reference characters refer to like parts throughout, and in which.

DETAILED DESCRIPTION OF PREFERRED EMBODIMENTS

A local airspace management network can be implemented to give an organization control or the ability to manage incoming and outgoing wireless communications and wireless devices that in the organization's airspace. Organizations are businesses, government organizations, installations, families, individuals, or other entities that own or have an interest in real estate (an office space, apartment, home, research facility, stadium, museum, restaurant, movie theater, school, etc.). Organizations typically have control over wired communications connections that are available on their premises. The same level of control or range of protection can be provided to organizations with respect to wireless devices by implementing local airspace management networks and airspace management protocols. Wireless devices that provide general telephone or personal communications services can be designed and marketed with such additional functionality. The inclusion of such a feature could provide an incentive to consumers because it would the alternative of manually shutting down, disabling, or turning over their device when they enter restricted areas of organizations.

The present patent application is directed to one or more inventions or embodiments of inventions. For example, principally, it should be understood that the present description is directed to local area airspace management. However, specific inventions or embodiments of inventions include (1) an IC chip for wireless devices that implement local airspace management; (2) cellular telephones comprising local airspace management; (3) WiMAX telephones comprising local airspace management; (4) WiFi telephones comprising local airspace management; (5) local airspace management infrastructure such as a transmitter that implements a local airspace management network; (6) an access point that includes local airspace management functionality; (7) a personal airspace management protocol that implements local airspace management networks. Each of these categories will be understood to provide an inventive concept. For convenience and clarity, supporting descriptions for these categories is provided throughout the patent application.

In a first example, local airspace management is directed to cellular telephones (otherwise known as mobile telephones) and to data devices (e.g., paging, e-mail, text messaging) that are configured to operate in wide area cellular networks. Networks that support the operation of such devices are typically assigned a specific frequency spectrum in association with a particular geographic region such as a city, state, or town to provide personal communications services within that geographic region.

Figure 1:
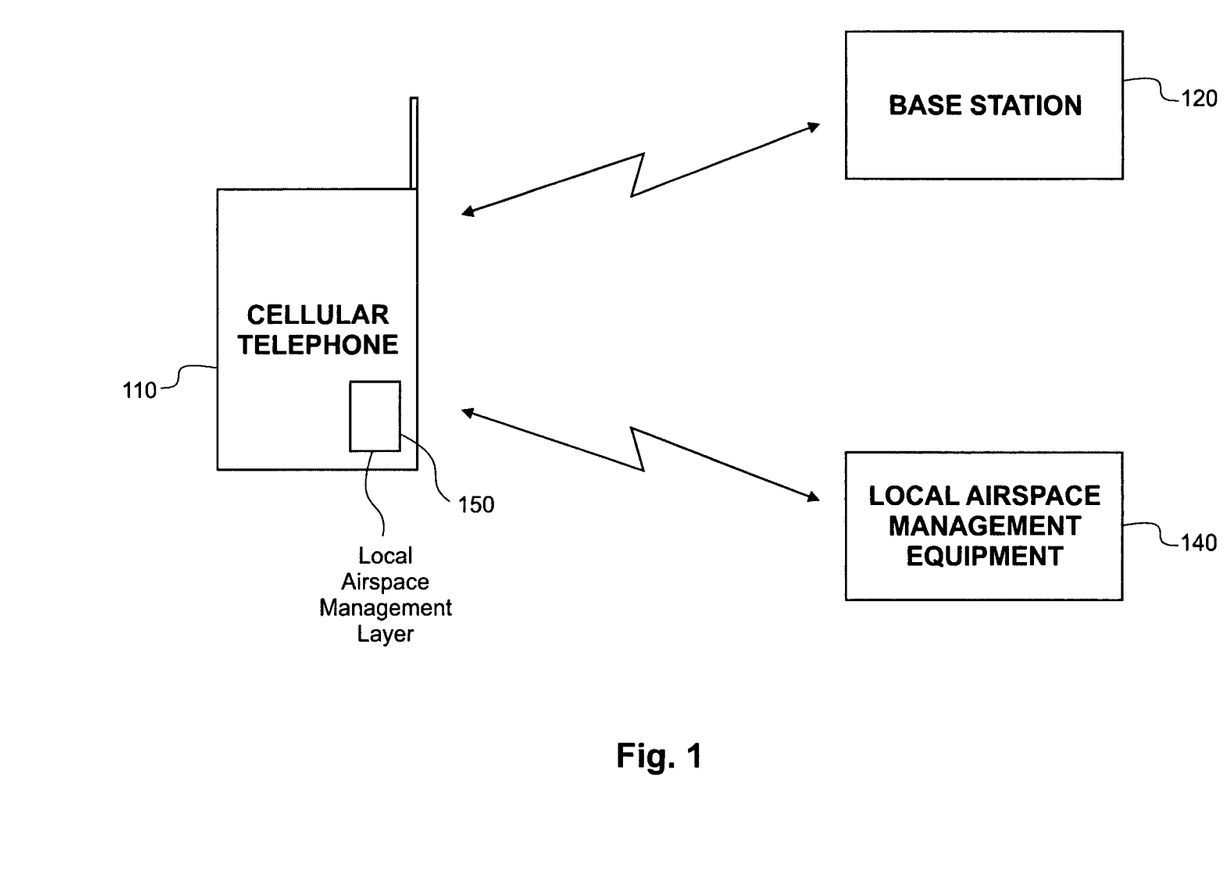
FIG. 1 is a functional block diagram of a local airspace management network that manages cellular telephones in accordance with one embodiment of the present invention.
Figure 2:
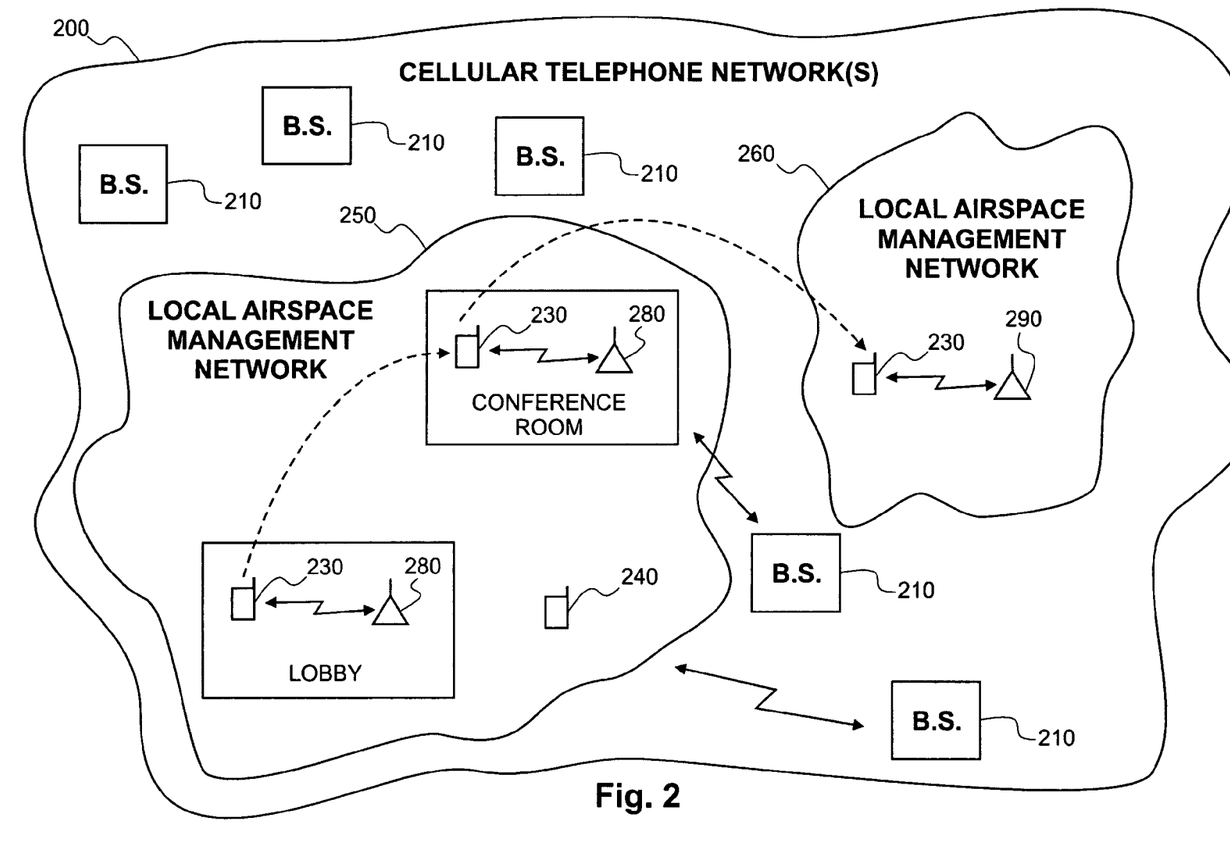
FIG. 2 is a functional block diagram of a plurality of local airspace management networks in relationship to a cellular wide area network in accordance with one embodiment of the present invention.

FIG. 1 is a functional block diagram that illustrates a top-level arrangement for implementing local airspace management for cellular telephones. For clarity and brevity, the illustration and related discussion of FIGS. 1 and 2 are directed to cellular telephones but if desired, can be applied to data devices that are supported by cellular communications networks. With reference now to FIG. 1, cellular telephone 110 may be a cellular telephone that is operable in a cellular telephone network such as one that is implemented using GSM, GPRS, CDMA, or other cellular telephone communications protocol. Presently, common manufacturers of such devices are Motorola, Nokia, and Sony Ericsson. In addition, combined data and voice devices are produced by companies such as RIM and Treo. Frequency bands that are generally assigned for use by such cellular telephones 110 can vary based on the intended country of operation (e.g., U.S., Japan, European countries). The cellular telephone network can for include base station 120 that communicates with cellular telephone 110 to enable voice communications and to provide control and management functionality within the cellular network. Cellular telephone 110 communicates with base station 120 on a frequency band that is assigned for use in the geographic region of the base station. For simplicity and clarity, a single base station is illustrated in FIG. 1. However, it is understood that in implementation, an array of base stations, cellular telephones and other network infrastructure is contemplated. Communications between base station 120 and cellular telephone 110 can, for example, be used to carry voice communications during a telephone call with cellular telephone 110. Such communications can also carry information or data that is displayable or stored in cellular telephone 110. Such communications are carried out as part of a first frequency band that is assigned to the communications network of cellular telephone 110.

Local airspace management can be implemented when cellular telephone 110 enters the vicinity of local airspace management equipment 140. Local airspace management equipment 140, for example, comprises, a transmitter (or a transceiver, if equipment 140 is configured for two-way communications) and, hardware and/or software that is suitable for storing and applying local airspace management policy. Hardware and/or software associated with a transmitter and local airspace management network can be co-located with the transmitter, can be distributed or remotely located from the transmitter, or can be implemented in a combination thereof. To implement airspace management, cellular telephone 110 is configured to include local airspace management layer 150. Layer 150 is implemented as part of the cellular telephone 110 to establish communications (e.g., using an 802.11b communications channel and protocol or some other appropriate frequency band or protocol) with equipment 140. The communications connection between layer 150 and equipment 140 can be a low bandwidth connection. This is because in operation, a limited volume of information will typically be required to be transmitted.

Layer 150 can be implemented using software that is implemented to run on a processor of cellular telephone 110. Layer 150 can also be implemented using hardware (e.g., specialized circuitry such as an IC chip that is dedicated to implementing local airspace management) or a combination of software and hardware. If desired, layer 150 can include an ASIC that is configured to provide local airspace management functionality. As such, wireless devices such as cellular telephones can include an integrated circuit that is designed and configured to implement local airspace management networks and/or to receive and apply the personal airspace management protocol, which may be integrally related. Also if desired, layer 150 can only comprise specialized circuitry that is needed for communications with equipment 140 (e.g., a receiver or transmitter that is tuned the frequency for airspace management communications). In such a case, control and operation are implemented using hardware and/or software that is implemented on cellular telephone 110 (e.g., intelligence for airspace management is installed in the operating system or a specialized application running on a processor on cellular telephone 110, such as a processor on so called smart phones). If desired, layer 150 can also be implemented using a plug-in device or card that provides local airspace management functionality or features. If specialized hardware is implemented as part of cellular telephone 110 to implement layer 150, the hardware can be integrated into cellular telephone 110 through the hardware bus of cellular telephone 110 to, for example, implement local policies via the operating system of cellular telephone 110. Alternatively or in combination with a hardware bus, the specialized hardware may be arranged to have direct access to particular components of cellular telephone 110 that a local entity may seek to manage or disable (e.g., shut off) such as a speaker, keyboard, or integrated peripherals such as a camera. Techniques for implementing layer 150 and applying local policies can for example include: using an application program interface that is configured to interface policy settings with an operating system of cellular telephone 110, using interrupts to notify the operating system or hardware to trigger the management of features, components, or peripherals of cellular telephone 110, or using predefined codes that are communicated to hardware or software on cellular telephone 110 (e.g., to communicate policy settings).

In this example, equipment 140 stores local policy information that is applied to wireless devices such as cellular telephone 110 when such devices are in the vicinity of equipment 140. Equipment 140 communicates with cellular telephone 110, specifically with layer 150, which may include its own receive and communications hardware and/or software. Communications between equipment 140 and layer 150 is preferably established using a different frequency band than used by the cellular network that provide personal communications services to the user. Thus, cellular telephone 110 can, for example, receive signals on a separate and distinct communications channel, which would not interfere with or add to the communications traffic of the cellular telephone network. Communications between equipment 140 and layer 150 and consequently cellular telephone 110 can be configured to be one way or two-way communications. In a one-way arrangement, equipment 140 can be configured to transmit local policy information to all devices that are in its vicinity for reception by layer 150 of those devices. The local policy information can be transmitted intermittently, continuously, or in some other suitable manner. In such embodiments, layer 150 would receive and store the policy information and apply the reflected policy within the cellular telephone 110 to manage the user or operation of telephone 110 or components or features therein. Thus, management or control of a wireless device can be applied at the device level independent of the operating environment of the communications services of telephone 110. Management or control can be used to apply local policies when a freely roaming mobile device enters the vicinity of local airspace management equipment 140. Such management and control can be implemented without involving user involvement.

If desired, a display of cellular telephone 110 may be used to display information related to the local airspace or may prompt user interaction in connection with communications with a local airspace management network (e.g., to ask for user identity or biometrics).

User authentication can be implemented to apply different policy settings. A user may be prompted to enter user authentication information or biometrics that is to be transmitted to equipment 140. Equipment 140 can store user information and can have access to (e.g., through a local network connection) to a user authentication database to retrieve information on users that for example have been given access to the local entity's computer networks. Equipment 140 can also use that information to determine polices to applied for a particular user of cellular telephone 110. Authentication information can be stored on cellular telephone 110 (e.g., as part of layer 150) to automatically enable services or to apply policies when a user reenters the vicinity of local airspace management equipment 140. User authentication can for example also provide the ability to a local user to be logged into the local area network of an organization at multiple nodes such as at the user's personal computer at his desk and also at that user's cellular telephone.

For Public places, no authentication may be required. However, in other types of environments, such as in corporate places, users permission level can be accessed and in corporate databases using protocol such as Lightweight Directory Access Protocol ("LDAP") or other appropriate mechanism for each peripheral, component, or device that is associated with a user and to determine privileges. For example, a local airspace management network can be implemented to have access or a connection to the data network of a corporate entity and could use that resource to obtain information associated with users via LDAP.

Certification can be implemented to ensure that management is applied by a trusted source. For example, certification information for one or more local entities can be stored on a local airspace management network (e.g., in association with a transmitter) such that a cellular telephone 110 (e.g., as part of layer 150) can challenge the authenticity of a network. Thus, such information ca be retrieved and examined by cellular telephone 110 (e.g., by layer 140) to determine whether equipment 140 should be permitted to apply local policy settings to cellular telephone 140. The certification information may be preloaded at installation.

Layer 150 can apply local management irrespective of the frequency or protocol used by a wireless device.

With reference now to FIG. 2, geographic area 200 is shown to be served by one or more cellular telephone networks. For example, several different cellular network operators are usually present at a given geographic location today as shown in FIG. 2. Each cellular network is assigned a different frequency band and may use different communications protocols. The networks provide their subscribers with cellular telephone services and functionality within their supported geographic area. Such services and functionality is applied network wide in whatever location within the network that a subscriber may roam. As shown such cellular telephone networks can include base stations 210. Base stations 210 as shown are configured to provide cellular network communications services to cellular telephones of network subscribers such as cellular telephone 230 and 240. For convenience and clarity, base stations 210 are illustrated to be at various locations in area 200 without illustrating a specific cellular relationship between base stations 210.

Local airspace management networks 250 and 260 can be configured to place portions of the airspace of the cellular telephone networks under local control. For example, local airspace management network 250 can be implemented to control the airspace of a company's headquarters. Further by way of example, local airspace management network 260 can be implemented by an employee of that company to manage wireless devices at his home. Local airspace management network 250 includes transmitters 280 that are used to apply local policy settings. For example, in operation, a user of cellular telephone 230 may first enter local airspace management network 250 in the vicinity of transmitter 280. In response (or as an automatic broadcast message), transmitter 280 may transmit local policy information to cellular telephone 230 to place cellular telephone 230 in a first state (e.g., a state that disables peripherals such as a camera). Cellular telephone 230 can be configured to maintain its current state when it is in the vicinity of transmitter 280. For example, a user can preferably be prevented from avoiding compliance by turning a device on and off. Thus, a device can be managed to maintain a state across sessions. As explained above, communications with network 250 is through a separate communications channel assigned for local airspace management. The channel may for example be a publicly available communications channel or one that is assigned to this type of activity. Transmitter 280 may for example be positioned in network 250 to manage the airspace of the lobby of the local entity. Multiple policy settings can be applied within a local airspace management network. For example, if the user moves to a conference room within network 250, a different transmitter 280 that is configured to manage the airspace of the conference room may be used to change policy settings of cellular telephone 230. Thus, each transmitter 280 may have an associated policy, which allows for variation in policy based on a devices vicinity to particular transmitter. In addition, variations in policy settings can be applied based on the identity, category, or role of a user. When a user moves form the lobby to a conference room, information transmitted to cellular telephone 230 can be used to establish limitations on cellular telephone 230 that is suitable for its current location. For example, the policy setting may disable personal communications services supported by the cellular network, or may apply other restrictions such as to disable a ringer or audible alerts. Subsequently, the user can travel home where another local airspace management network is implemented to apply policies that a user desires within a home setting. For example, transmitter 290 may have associated policy settings that are put into place when cellular telephone 230 enters its vicinity. Transmitters 280 and 290 may also apply local policies to other devices that are configured to include layer 150 (FIG. 1).

Policy settings can be applied based on a wireless device being in the general vicinity of a particular transmitter. Thus, policy settings can be applied without determining the precise physical location of a device and further, translating that information to a particular area within an area to identify the policy setting for that particular area. If desired, however, in some embodiments, location information such as the precise physical location of a device such as the location as determined using GPS could be used for applying policy settings. Not using precise location information (e.g., GPS, triangulation, etc.), however, can provide a simpler, quicker, and more effective tool for applying policy settings. One way of determining whether policy settings should be applied to a particular wireless device can be by using one or more limited range transmitters that have a coverage area that generally matches a particular space to which a particular policy is to be applied. Note that an exact delineation, for example, corresponding to the walls of an office or area may not necessarily be needed. For example, areas within an office space that have a higher range of policy restrictions can be covered by one or more transmitters that cover not only the corresponding airspace but also cover an areas that extends slightly beyond the airspace of interest. Thus, for example, the wireless device of a user who is leaving a conference room to enter a lobby or hallway can remain under the policy settings of the conference room until the user has moved sufficiently away from the conference room. When adjacent areas have conflicting or different policy requirements, exceptions to the overlapping policy settings can, for example, be implemented through user authentication. In addition, other techniques for limiting transmitter coverage to an area of interest or determining the general vicinity of a wireless device within an area such as a campus or an office space are known to those of skill in the art. For example, demarcation signals can be transmitted (e.g., by additional transmitters) at entranceways to switch policy settings on and off or to indicate a transition between policy settings. In addition, control over entranceways can also provide a switch for applying policy settings without having to provide transmitter coverage for an entire room or space.

In another example, local airspace management is directed to Wireless/Mobile Voice over IP telephone handsets, which are generally referred to herein as VoIP telephones. Note that different types of wireless devices (e.g., cellular telephones, VoIP telephones, WiMax telephones) can be managed by a local airspace management network. VoIP telephones are generally implemented to operate over a wireless local area network, such as those implemented using WiFi (e.g., using 802.11a, b, and g) in office buildings and homes. As in cellular telephones, VoIP telephones can include attached or integrated peripherals such cameras and can also include personal communications capability for data services such e-mail or messaging. VoIP telephones are generally configured for short-range use within a local area. VoIP communications use frequencies that are assigned to local wireless LAN networks. In general VoIP telephones and protocols for implementing such data or voice communications are generally known by those skilled in the art. One advantage of VoIP telephones is that the handsets are already integrated into the wireless local network of an entity, which can use that network to implement security, authorization or authentication for the purpose of local airspace management. However, a disadvantage of such VoIP telephones and supporting networks is that the need to management local airspace and apply local policy settings are not adequately addressed.

Figure 3:
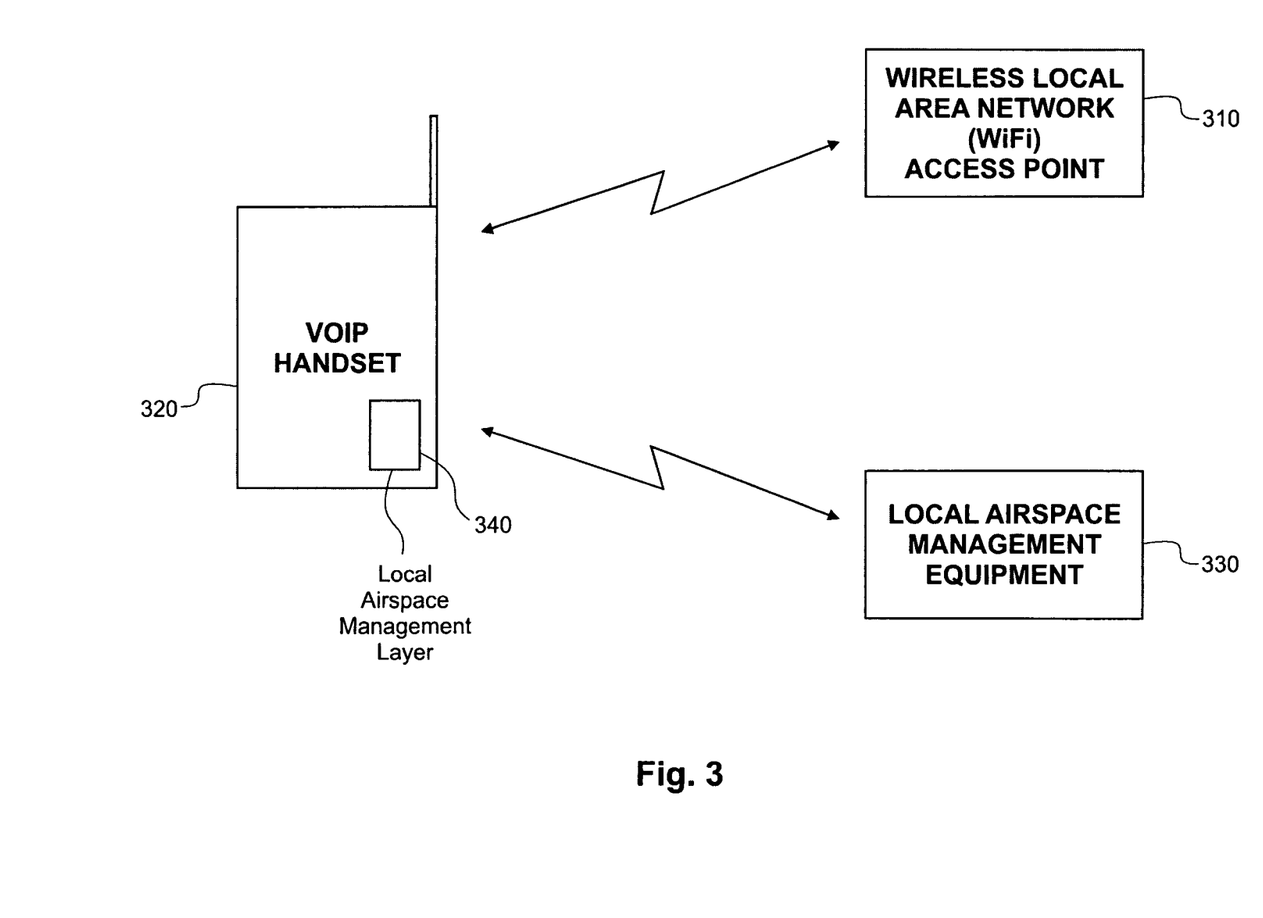
FIG. 3 is a functional block diagram of a local airspace management network that manages WiFi telephones in accordance with one embodiment of the present invention.

With reference to FIG. 3, a WiFi network may include WLAN access point 310 and one or more VoIP telephones 320. A local airspace management network that overlaps or is part of the coverage area of the WiFi network can include local airspace management equipment 330. For simplicity and clarity, a single VoIP telephone 320 and access point 310 is illustrated. It will be understood by one of ordinary skill in the art that equipment 330 may comprise one or more transmitters and associated hardware and/or software that is co-located or distributed in different locations within an area. VoIP telephone 320 can include local airspace management layer 340. Local airspace management layer 340 and equipment 330 can be implemented to provide local airspace management of VoIP telephones 320 by applying local policy settings. It should be understood that the discussion above with respect to local airspace management equipment 140 and local airspace management layer 150 of FIG. 1 is also applicable to local airspace management equipment 330 and local airspace management layer 340 of FIG. 3. Thus, through one or more communications between equipment 330 and layer 340, VoIP telephone 320 can be managed such to shut off or disable telephone 320 or components, features, or peripherals thereof. Local airspace management layer would of course be adapted and configured to be operable on VoIP telephone 320 and to apply local policy settings. Local airspace management can also be applied in the same way as described above in connection with FIG. 2.

Figure 4:
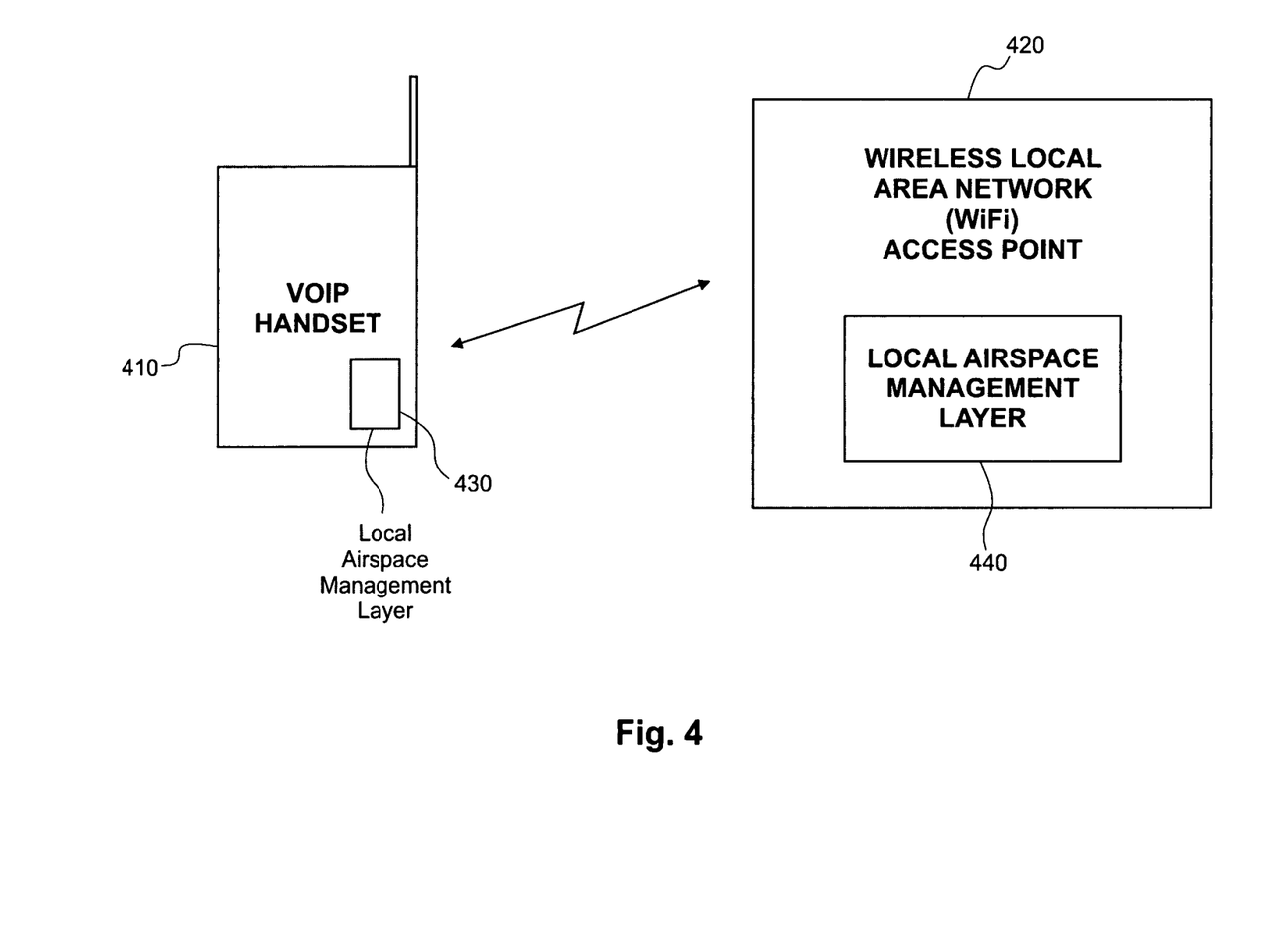
FIG. 4 is a functional block diagram of a local airspace management network that manages WiFi telephones through a WLAN in accordance with one embodiment of the present invention.

In another example (FIG. 4), local airspace management layers 430 and 440 can be implemented in a WLAN to apply local airspace policies (e.g., policies that change as a user moves within an office or home). If desired, management can be applied through the same mode of communications that is used to support VoIP telephone communications (e.g., using 802.11 communications). In this example, a second separate and distinct communications frequency band or protocol is not used to provide local airspace management. In operation, local airspace management layers 430 and 440 are used to apply policy settings, for example, in the same manner as described in connection with FIGS. 1 and 2. In FIG. 4, only a single VoIP telephone 410 and access point 420 is illustrated, but in application it is understood that such an arrangement is used for multiple VoIP telephones and access points that together provide VoIP communications services.

In a further example, local airspace management is directed to WiMAX telephones or other mobile wireless devices for providing personal communications services that are configured to provide data or voice content (telephone, e-mail, messaging, etc.) using 802.16 (WiMAX) communications. Individual base stations in a WiMAX can typically have a longer range of coverage (e.g., 15-30 miles) as compared to base stations in a cellular telephone network (e.g., a range of 1-2 miles). A WiMAX network can be used to implement personal communications services such as telephone or data content and could support integrated devices (e.g., data and voice, voice and peripherals as such as a camera).

Figure 5:
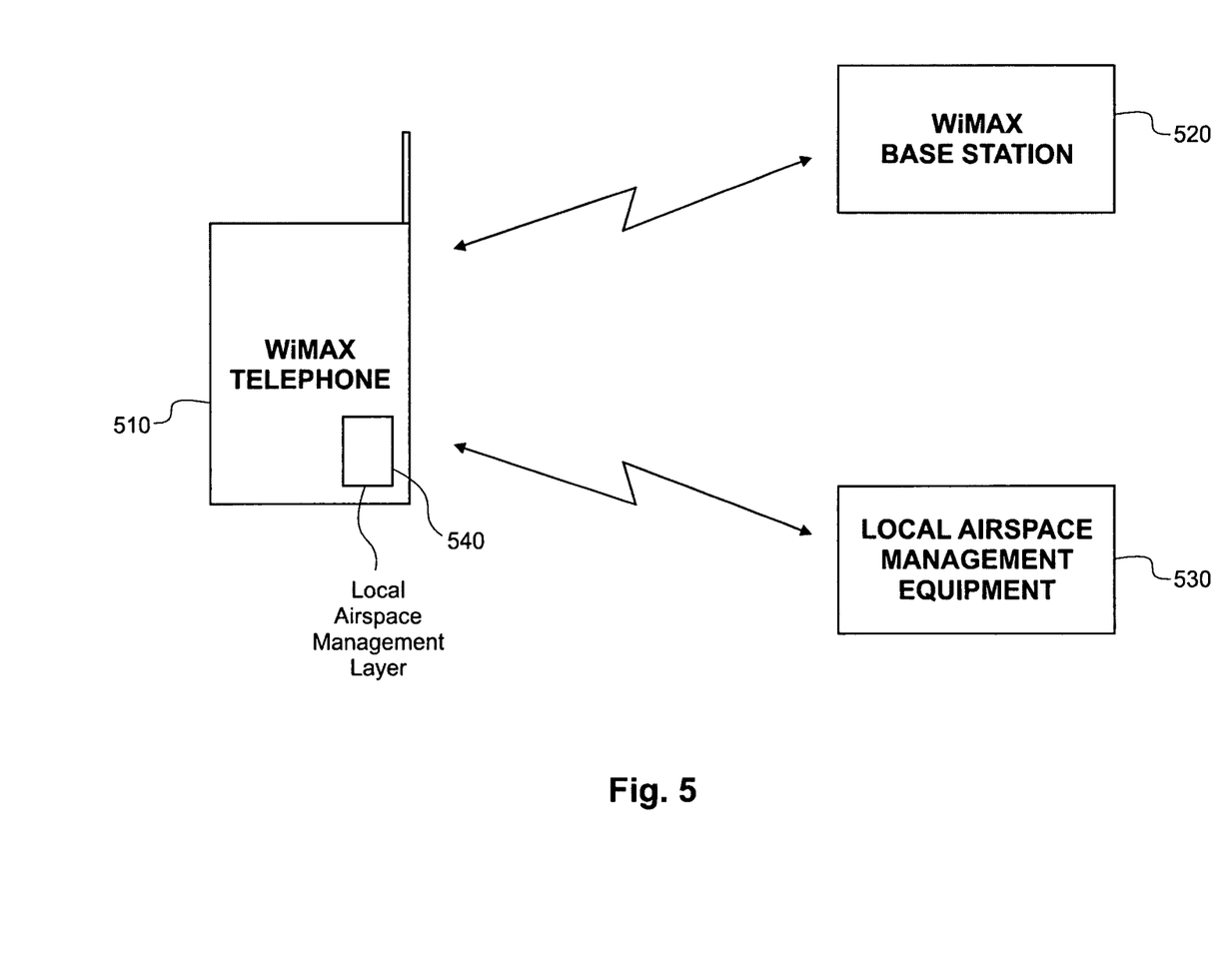
FIG. 5 is a functional block diagram of a local airspace management network that manages WiMAX telephones in accordance with one embodiment of the present invention.

For brevity and clarity, WiMAX devices that are implemented to provide wireless communications services are primarily referred to herein as WiMAX telephones. With reference now to FIG. 5, a WiMAX network can include multiple WiMAX telephones 510 and one or more WiMAX base stations 520. WiMAX telephone 510 can be configured to establish voice communications through base station 520 using a frequency assigned to the WiMAX network. Local airspace management equipment 530 and local airspace management layer 540 can be configured to establish a local airspace management network for a particular campus or region that is also serviced by the WiMAX network. In operation, local policy settings of the campus or sub-areas within the campus can be applied by local airspace management equipment 530 and layer 540. As shown, a separate and distinct communications frequency band is used for establishing the local airspace management network. In operation, local airspace management layers 430 and 440 are used to apply policy settings, for example, in the same manner as described in connection with FIGS. 1 and 2. In addition, the description of local airspace equipment 140 and layer 150 is also applicable to local airspace management equipment 530 and local airspace management layer 540.

In one embodiment, a local airspace management network can be configured to apply policy settings through the network operator that provides personal communications services to wireless device users. For example, in a cellular telephone scenario, a local airspace management network can communicate with a cellular network operator (e.g., communicate with a cellular wide area network) to apply local policies to a cellular telephone through a communication that initiated by the local airspace management network and communicated to a wireless device through the cellular network. Thus, a command to disable a camera on cellular telephone can be transmitted by the cellular network in response to a request or communication received from a local airspace management network. The same can, for example, also apply in other embodiments of local airspace management networks such as in the WiFi or WiMAX embodiments illustratively described above. To implement such a feature, a request to apply local policies can, for example, be automatically sent (to a personal communications services network) based on detecting a particular wireless device within a particular local area or can be manually sent (e.g., by requesting that users that enter a particular area provide their telephone numbers to the establishment).

Local policy that is implemented by a local airspace management network can be a single policy setting or a set of settings that together form a policy. Examples of various policy settings can include:

Managing the ability of a wireless personal communications services device ("PCS device") to take pictures such as to disable an integrated camera;

Managing the ability of a PCS device to take video such as to disable video camera functionality of a device;

Managing the ability of a PCS device to record conversations such as to disable such a capability;

Managing the ability of a PCS device to generate auditory alerts such as to disable the ringer of a device or to automatically lower the volume of the ringer;

Managing the ability of a PCS device to generate visual alerts such as to disable an alert light or disable a display screen of a device;

Managing the ability of a PCS device to generate kinesthetic alerts such as to disable a vibrate alert of a device;

Managing the display of a PCS device such as to disable or decrease the brightness of the backlight of a PCS device;

Managing the ability of a PCS device to receive or answer incoming calls such as to disable all such an ability or to disable such an ability with exceptions;

Managing the ability of a PCS device to make or establish outgoing calls such as to disable all such ability or to disable all such ability with exceptions;

Managing the ability of a PCS device to limit incoming or outgoing calls such as to limit the number or duration of calls or to limit the content of such calls (e.g., limit to only local telephone calls, block the ability to make international calls, block telephone calls except to certain area codes); or Managing the ability of a PCS device to provide data services such as limit SMS services (e.g., limit incoming, limit outgoing, etc.) or limit e-mail message (e.g., limit incoming and/or outgoing e-mails).

Groups of policy settings can be preconfigured as easy solutions for those who wish to manage their local airspace. For example, a public setting can be established for businesses that include a public environment that applies a local policy directed to avoiding nuisances that are created by the use of cellular telephones in the public environment such as in restaurants and movie theaters. In such situations, one or more public settings can be preconfigured and provided as a setting in local airspace management equipment. Thus, for example, a switch may be provided as part of such equipment that allows for a business to select one or more preconfigured public settings. The ability to configure custom settings may also be provided. In some embodiments, a remote control or timer can be implemented to switch between different policy settings such as to for example remotely change the local settings in a movie theater when a movie is played by sending a command to a local airspace management network such as to a transmitter of the network.

Policy information can, for example, be stored as a file at a transmitter in a local airspace management network, centrally stored in a network location that connects to the transmitter, stored on wireless devices under management, in combinations thereof, or using other arrangements.

Particular advantage can be obtained in a home setting. For example, by incorporating a local airspace management layer in various computers, peripherals, and wireless devices, control over the usage and operation of such devices can be obtained. In addition, control over the type of content or applications being access can also be achieved at a local level in a fast and convenient way. For example, a local airspace management layer (e.g., a chipset) can be integrated into laptop computers, gaming consoles, portable gaming devices, televisions, set top boxes, PDAs, or personal communications services devices to allow a parent to apply their policies within their home. The local airspace management network would communicate the policy or apply the policy to devices that are in the home including to foreign device that have newly entered a home such as the laptop computer of someone who is visiting the home. Thus, local policy with respect to the type of content that can be accessed or level of usage of wireless devices can be centrally controlled or managed by the local airspace management network, which may be configured as a separate network or as described above, can be implemented as part of a WLAN in a home. Such techniques can also be applied in other settings such as in schools.

A personal airspace management protocol ("PAMP") can be implemented in a local airspace management network to establish communications and operations within the local airspace management network. Local airspace management equipment and on local airspace management layers of wireless devices can implement PAMP. PAMP can be implemented in software, hardware, or in combinations thereof. For example, all or a portion of the protocol can be implemented on a dedicated chip (e.g., a chip that implements a local airspace management layer) that is installed on a wireless device or in or at a transmitter of a local airspace management network. PAMP can be configured to operate on a frequency band that a wireless device or local airspace communications network equipment will be tuned to for communications purposes. In the example of VoIP communications, PAMP may be configured to communicate on a particular port that is assigned to local airspace management networks (e.g., by IANA). Local policy information, user data, and/or wireless device information can be carried by PAMP to implement local airspace management policies and functionality desired by organization that seek to apply their local polices to wireless devices that enter their airspace.

In one embodiment, PAMP includes a broadcast message that is used to communicate local policy. As mentioned above, the policy communicated in the broadcast message can vary from transmitter to transmitter to match local policy settings and to manage wireless device states. In some embodiments, PAMP may be implemented to cause a reply message to be communicated by wireless devices to transmitters. The reply message can be an acknowledgement or confirmation of the acceptance of a policy. In some embodiments, PAMP communicates identifying information of the wireless device or its user such as a telephone number to a transmitter. If desired, a wireless device can be configured to allow a user to configure the local airspace management settings of that user's wireless device such as by selecting to block certain information such as user or device identification (e.g., telephone number, MAC address, etc.) from being communicated to a transmitter.

PAMP can include a communications protocol between a wireless device and a local airspace management network to implement user authentication and/or certification of a local airspace management networks. In some embodiments, PAMP may include procedures where a wireless device and a local airspace management network can negotiate services that a user will be permitted to use while located within the vicinity of that local airspace management network (e.g., a user may challenge the policy communicated to the user's wireless device).

Information that is transmitted to a local airspace management network by a wireless device such as user identification, wireless devices type, software applications implemented on a device, or user associated data such as a user profile on a device can be used or communicated to other networks for the purpose directing advertisements to user's based on the received information. Thereby, targeted advertising can be applied to a user based on such information. The targeted advertisement can also be presented in public spaces in which a user is about to enter based on such received information. For example, an advertiser can advertise a new cell phone on an electronic billboard when it recognizes that a user who is approaching has a competitor's cellular telephone.

In some embodiments, the local airspace management network can be configured to hide available services (e.g., a WLAN access point) from a visiting wireless device until, for example, the user of the device has been authenticated.

In some embodiments, a wireless device can be a dual-mode telephone such as one that can switch between cellular communications and WiFi communications, in such cases, the local airspace management can be implemented to apply to both modes.

In some embodiments, the circuitry that is implemented to provide a local airspace network layer has control over wireless devices, its components, peripherals, or other resources for the purpose of applying local policies.

In some embodiments, a local airspace management network can disable a wireless device except for permitting emergency telephone calls.

In some embodiments, a local airspace management network can be implemented in an area of national security interest such as an airport to manage wireless device usage such as to limit telephone usage to U.S. citizens, while for example, individuals are in customs.

Thus, a convenient method and system can be provided for the local management of wireless device.

Although this present invention has been described in considerable detail with reference to certain preferred versions thereof, other embodiments are possible. Therefore, the spirit and scope of the invention should not be limited to the description of the preferred embodiments contained herein.

What is claimed is:

1. An apparatus for managing a wireless device based on local airspace policies of an organization, comprising an integrated circuit that is implemented on wireless personal communications services devices to apply the local airspace policy when one of the wireless devices is present within the airspace of the organization, wherein the integrated circuit is configured for use in the apparatus in multiple different locations within a campus of an organization, and the integrated circuit being further configured to store multiple user categories and corresponding device-level location usage rights for each user category permitting different access to the usage rights from one campus location to another campus location and being further configured to use a third party certifier message transmitted to users in a near location to bind user usage rights on their wireless devices, and is further configured to retrieve and examine trusted network certification information for one of a plurality of locations from the wireless device to determine that the airspace policy is from a trusted source.

2. The apparatus of claim 1 wherein the integrated circuit is dedicated to applying the local policies of organizations.

3. The apparatus of claim 1 wherein the integrated circuit is an ASIC.

4. The apparatus of claim 1 wherein the integrated circuit implements a local policy that disables a wireless device or that disables components, features, or peripherals of the device.

5. The apparatus of claim 1 wherein the integrated circuit receives local policy on a first frequency band and provides personal communications services on a separate and distinct second frequency band.

6. The apparatus of claim 1 wherein the integrated circuit implements a local policy that disables a camera that is integrated into the wireless device.

7. A cellular telephone that incorporates an integrated circuit for managing the cellular telephone based on a local policy of an organization, wherein the integrated circuit is designed and configured to apply the local airspace policy when the cellular telephone is present within the airspace of the organization, wherein the integrated circuit is configured for use in the cellular telephone in multiple different locations of cellular coverage, and the integrated circuit being further configured to store multiple varying user categories and corresponding device-level usage rights for each user category permitting different access to the usage rights from location to location and being further configured to store certification information for locations and use a third party certifier message received from a near location to bind user usage rights on the cellular telephone, and is further configured to retrieve and examine trusted network certification information for one of a plurality of locations from the cellular phone to determine that the airspace policy is from a trusted source.

8. The cellular telephone of claim 7 wherein the integrated circuit implements a local policy to disable functionality generally available to the cellular telephone user within the cellular network.

9. A WiMAX telephone that incorporates an integrated circuit for managing the WiMAX telephone based on a local policy of an organization, wherein the integrated circuit is designed and configured to apply the local airspace policy when the WiMax telephone is present within the airspace of the organization, wherein the integrated circuit is configured for use in the WiMAX telephone in multiple different locations of WiMAX coverage, and the integrated circuit being further configured to store multiple varying user categories and corresponding device-level usage rights for each user category permitting different access to the usage rights from location to location and being further configured to store certification information for locations and use a third party certifier message received from a near location to bind user usage rights on the WiMAX telephone, and is further configured to retrieve and examine trusted network certification information for one of a plurality of locations from the WiMAX telephone to determine that the airspace policy is from a trusted source.

10. A WiFi telephone that incorporates an integrated circuit for managing the WiFi telephone based on a local policy of an organization, wherein the integrated circuit is designed and configured to apply the local airspace policy when the WiFi telephone is present within the airspace of the organization, wherein the integrated circuit is configured for use in the WiFi telephone in multiple different locations of WiFi coverage, and the integrated circuit being further configured to store multiple varying user categories and corresponding device-level usage rights for each user category permitting different access to the usage rights from location to location and being further configured to store certification information for locations and use a third party certifier message received from a near location to bind user rights on the WiFi telephone, and is further configured to retrieve and examine trusted network certification information for one of a plurality of locations from the WiFi telephone to determine that the airspace policy is from a trusted source.

11. Local airspace management network equipment comprising:
a transmitter and related circuitry that is configured to transmit a local airspace policy to wireless devices that enter its airspace to manage such wireless devices, wherein the circuitry is configured for use in the equipment in multiple different locations by having the circuitry being further configured to store multiple user categories and corresponding device-level location usage rights for each user category permitting different access to the usage rights from location to location and being further configured to use a third party certifier message transmitted to users to bind user usage rights on their wireless devices, and the wireless device configured to retrieve and examine trusted network certification information for one of a plurality of locations from the wireless device to determine that the airspace policy is from a trusted source.

12. The equipment of claim 11 wherein the transmitter comprises an integrated circuit that is configured to implement a local airspace management network.

13. The equipment of claim 12 wherein the integrated circuit is dedicated to implementing a local airspace management network.

14. The equipment of claim 11 wherein the transmitter is assigned to operate on a frequency band that is different than the frequency band used for personal communications services that are provided by the wireless devices.

15. The equipment of claim 11 wherein software is implemented at the transmitter to implement a local airspace management network.

16. The equipment of claim 11 wherein a transceiver is in communications with a database in accordance with LDAP or other directory access protocol for user authentication and permission information.

17. The equipment of claim 11 wherein the transmitter is designed and configured to transmit the local policy only within an airspace controlled by an organization that sets the local policy.

18. The equipment of claim 17 wherein at least one of an integrated circuit or software implements a local airspace management layer on a wireless device.

19. Local airspace management network equipment comprising WiFi or WiMAX access point that includes a local airspace management layer that is configured to initiate transmission of the local airspace policy to wireless devices that enter its airspace, wherein the access point is configured for use in multiple different locations, and the integrated circuit being further configured to store multiple user categories and corresponding device-level location usage rights for each user category permitting different access to the usage rights from one access point location to another access point location and being further configured to use a third party certifier message sent to users in its airspace to bind user usage rights on wireless devices, and is further configured to retrieve and examine trusted network certification information for one of a plurality of locations from the wireless device to determine that the airspace policy is from a trusted source.

20. A method for providing a local airspace management network comprising:

implementing a personal airspace management protocol on the network equipment of a campus of an organization that establishes communications and carries policy information to wireless devices that are operatively associated with a local airspace management network, wherein the protocol is configured for use in the network in multiple different locations within the campus of the organization, and the network equipment being configured implement the protocol whereby the equipment stores multiple user categories and corresponding device-level location usage rights for each user category permitting different access to the usage rights from one campus location to another campus location and being further configured to use a third party certifier message transmitted to users in a near location to bind user usage rights on their wireless devices, and is further configured to retrieve and examine trusted network certification information for one of a plurality of locations from the wireless device to determine that the airspace policy is from a trusted source.

21. The method of claim 20, wherein the personal airspace management protocol is implemented on wireless devices that are connected to the local airspace covered by the network.

22. The method of claim 21, wherein the wireless devices include an integrated circuit that is designed and configured to receive and apply the personal airspace management protocol.

23. The method of claim 20, wherein the personal airspace management protocol is implemented as the wireless devices that pass an access point to the local airspace.

24. A non-transitory computer-readable medium on which machine-readable instructions for implementing a method is recorded, the method comprising:

a personal airspace management protocol that establishes communications and carries policy information on the network equipment of a campus of an organization to wireless devices that are operatively associated with a local airspace management network, wherein the protocol is configured for use in the network in multiple different locations within the campus of the organization, and the network equipment being configured implement the protocol whereby the equipment stores multiple user categories and corresponding device-level location usage rights for each user category permitting different access to the usage rights from one campus location to another campus location and being further configured to use a third party certifier message transmitted to users in a near location to bind user usage rights on their wireless devices, and is further configured to retrieve and examine trusted network certification information for one of a plurality of locations from the wireless device to determine that the airspace policy is from a trusted source.

25. The non-transitory computer-readable medium of claim 24, wherein the protocol is implemented on wireless devices using an integrated circuit that is designed and configured to receive and apply the personal airspace management protocol.

26. The equipment of claim 19 wherein the WiFi access point is implemented in a residential router for networking home computer components when wherein the layer is used to implement and apply parental control settings selected for computer components in the home.

* * * * *